Patented Sept. 20, 1938

2,130,997

UNITED STATES PATENT OFFICE 2,130,997

PROCESS FOR THE TREATMENT OF ABIE-TYL COMPOUNDS AND PRODUCTS PRODUCED THEREBY

Edwin R. Littmann, Wilmington, Del., assignor to Hercules Powder Company, Wilmington, Del., a corporation of Delaware No Drawing. Original application June 12, 1936, Serial No. 84,877. Divided and this application September 9, 1936, Serial No. 100,039

20 Claims. (Cl. 260—103)

This invention relates to a process for the treatment of rosin, rosin acids, and compounds derived from rosin which contain the hydrocarbon nucleus characteristic of rosin acids, and to the products thereof. More specifically, this invention relates to the treatment of such compounds, so as to decrease their unsaturated characteristics, and to the products resulting from such treatment.

This treatment in accordance with this invention comprises essentially contacting rosin, a rosin acid, or other compound containing the hydrocarbon nucleus of a rosin acid with a catalyst of the type hereinafter described, in a manner to exclude the possibility of reaction between the rosin or rosin derivative and any added material capable of reducing the unsaturation of the rosin acid nucleus. As a result of such treatment a change in the chemical and physical properties of the rosin or rosin derivative takes place, and the resultant product will be found to have a greatly decreased unsaturation. In many cases, the product will also be found to have a higher melting point and improved properties. These changes in the physical and chemical characteristics of the material are believed to be due to an intra- and inter-molecular rearrangement of the hydrogen atoms occurring therein, with no change in the carbon skeleton.

The catalysts which may be used in effecting this change are those which catalyze the hydrogenation of unsaturated organic compounds, as, for example, nickel, copper chromite, platinum, palladium, etc. While both base and noble metal hydrogenation catalysts are useful in producing this change or intra- and inter-molecular rearrangement, a catalyst of noble metal supported on an inert carrier is particularly effective. Palladium in an amount within the range of about 1% to about 25% supported on an inert carrier, such as, for example, granular alumina or fibrous asbestos, is preferred.

A novel type of palladium catalyst, devised especially for the process in accordance with this invention, may be made as follows:

A solution containing 1 part by weight of palladium chloride, 2 parts by weight of concentrated hydrochloric acid and 8 parts by weight of water is adsorbed on 15 parts by weight of granular alumina. This mixture is then treated with 2 parts by weight of an approximately 37% formaldehyde solution, followed with approximately 15 parts by weight of an approximately 10% sodium hydroxide solution, enough to make the solution slightly alkaline and precipitate the palladium black. After thorough agitation, the mixture is filtered, washed with water, dilute acetic acid, and then again with water, until neutral. The product is then finally dried in an oven at 80° C. to 100° C. This catalyst is most efficient in the treatment in accordance with this invention and its use is preferred.

Rosin is a mixture of isomeric rosin acids having the formula $C_{19}H_{29}COOH$, in which the group $C_{19}H_{29}$ has been shown to contain two double bonds and to possess an alkylated phenanthrene nucleus. It will be understood that when reference is made herein to a rosin acid, a carboxylic acid found in rosin and containing the group $C_{19}H_{29}$, is meant. More than fifty different isomeric rosin acids have been reported in the literature. The best known of these acids are abietic acid, sapinic acid and d-pimaric acid. The relative proportions in which these and the other isomeric rosin acids occur in a given sample of rosin depends on the source of the rosin. Thus, wood rosin contains more abietic acid than any of the other acids, while American gum rosin contains more sapinic acid. French gum rosin contains more d-pimaric acid.

The hydrocarbon nucleus of each of these isomeric acids is capable of reaction in accordance with this invention, and for the purposes of this invention they are entirely equivalent. Thus, for example, any of the various grades of American wood rosin, American gum rosin, French gum rosin, Portuguese gum rosin, Spanish gum rosin etc., may be treated to reduce their unsaturated characteristic. The several isomeric acids found in various types of rosin, for example, abietic acid, d-pimaric acid, sapinic acid, etc., may be separated and treated in purified form if desired. Likewise, compounds derived from rosin or the rosin acids without alteration of the $C_{19}H_{29}$ nucleus are equivalent to the rosin or rosin acids for the purposes of this invention. Further partially hydrogenated rosins and compounds containing a partially hydrogenated hydrocarbon nucleus of a rosin acid are still further reduced in unsaturation when treated by the process in accordance with this invention and are likewise equivalent to the unhydrogenated compounds from the standpoint of this invention. Such compounds are characterized by containing somewhere in their structure the hydrocarbon group $C_{19}H_{31}$ containing one double bond, and are present in any hydrogenated rosin or rosin acid, less than 100% saturated with hydrogen, to an extent determined largely by the degree of saturation.

The class of compounds which may be treated in accordance with the process of this invention to decrease their unsaturation and improve their properties are characterized by containing somewhere in their structure an alkylated phenanthrene group containing two double bonds and having the formula $C_{19}H_{29}$ or a partially hydrogenated phenanthrene group containing one double bond and having the formula $C_{19}H_{31}$. No generic term has developed in the literature to cover this closely related group of compounds, so for convenience I will term them "Rosinyl compounds". The term "Rosinyl compound" will hereinafter be understood to include the abietyl compounds, the similar groups of compounds derived from rosin acids isomeric with abietic acid, partially hydrogenated abietyl compounds, and the similar partially hydrogenated compounds derived from rosin acids isomeric with abietic acid. This term is not intended to include rosins or compounds derived from rosins which have been hydrogenated sufficiently to remove both double bonds or to include compounds derived from rosin by a process which materially alters the hydrocarbon skeleton of the rosin acid.

In addition to the various rosins, rosin acids, partially hydrogenated rosins, and partially hydrogenated rosin acids mentioned hereinbefore, there are many other "Rosinyl" compounds which may be treated in accordance with this invention. Thus, for example, I may treat the monohydric and polyhydric alcohol esters of rosins, rosin acids, partially hydrogenated rosins or partially hydrogenated rosin acids, such as, for example, their esters with methanol, ethanol, propanol, iso-propanol, butanol, iso-butanol, oleyl alcohol, lauryl alcohol, abietyl alcohol, hydroabietyl alcohol, furfuryl alcohol, tetra-hydrofurfuryl alcohol, ethylene glycol, diethylene glycol, triethylene glycol, glycerol, erytheritol, pentaerytherol, sorbitol, mannitol, mixtures thereof, phenol, etc. I may treat alcohols produced from rosins and rosin acids, partially hydrogenated rosins, or partially hydrogenated rosin acids, by the reduction of the carboxyl groups of the rosin acids, such as, for example, abietyl alcohol, dihydroabietyl alcohol, sapinyl alcohol, dihydrosapinyl alcohol, pimaryl alcohol, dihydropimaryl alcohol, etc. Again, I may treat ethers formed by the etherification of the alcohols derived from rosins, rosin acids, partially hydrogenated rosins, and partially hydrogenated rosin acids with aliphatic, aromatic, or hydroaromatic alcohols, such as, for example, abietyl methyl ether, abietyl ethyl ether, abietyl butyl ether, abietyl phenyl ether, abietyl bornyl ether, abietyl terpinyl ether, pimaryl methyl ether, pimaryl ethyl ether, pimaryl propyl ether, pimaryl phenyl ether, pimaryl bornyl ether, pimaryl terpinyl ether, sapinyl methyl ether, sapinyl ethyl ether, sapinyl propyl ether, sapinyl butyl ether, sapinyl phenyl ether, sapinyl bornyl ether, sapinyl terpinyl ether, etc. Likewise, I may treat hydrocarbons produced by the decarboxylation of rosins, rosin acids, partially hydrogenated rosins, partially hydrogenated rosin acids, etc., such as, for example, those produced by the treatment of rosins, rosin acids, partially hydrogenated rosins and partially hydrogenated rosin acids with a catalyst, as, p-toluene sulphonic acid, at an elevated temperature, according to the process disclosed in U. S. Patent 1,975,211 to Alan C. Johnston, or by treatment with fuller's earth at an elevated temperature.

Compounds which contain in their structure a rosin acid nucleus or partially hydrogenated rosin acid nucleus which has undergone the intra- and inter-molecular rearrangement produced by the process in accordance with this invention, will hereinafter be referred to as "Hyex" compounds. The catalytic reaction by which the unsaturation of the rosin acid nucleus or the partially hydrogenated rosin acid nucleus is reduced will be termed the "Hyex reaction".

In carrying out the process in accordance with this invention, the "Rosinyl" compound will be brought into contact with a hydrogenation catalyst, preferably at an elevated temperature in order that a practical reaction rate may be obtained; however, the use of an elevated temperature is not necessary for the accomplishment of the desired result. The optimum temperature range for most satisfactory results is from about 150° C. to about 250° C., and a temperature of about 220° C. to about 250° C. is preferred. Pressure has little or no effect on the reaction, which may be carried out in vacuo or at superatmospheric pressure if desired. Since atmospheric pressure is most convenient from an apparatus standpoint, such will usually be used.

As thorough contact between catalyst and rosin or rosin acid can best be obtained when the "Rosinyl" compound or partially hydrogenated "Rosinyl" compound is in liquid or vapor phase, the "Rosinyl" compound or partially hydrogenated "Rosinyl" compound will preferably be heated to render it sufficiently fluid for desired contact with the catalyst. While, under certain circumstances it is desirable to carry out the reaction in the vapor phase, ordinarily I prefer to carry it out with a liquid phase. The "Rosinyl" compound or the partially hydrogenated "Rosinyl" compound may be in the molten condition or may, if desired, be dissolved in a suitable inert, non-reactive solvent, and the solution so formed treated with a hydrogenation catalyst. Any solvent for the compound treated which is not a poison to a hydrogenation catalyst and which does not contain catalyst poisons as impurities and which does not enter into the "Hyex" reaction is suitable for this purpose. Thus, for example, aliphatic hydrocarbons, the various petroleum fractions, monocyclic aromatic hydrocarbons, hydrogenated aromatic hydrocarbons, etc., are suitable for the purpose. The aliphatic hydrocarbons and the various petroleum fractions are particularly useful.

In accordance with this invention it is essential that the treatment of the "Rosinyl" compound be carried out in such a manner that no reaction can occur between the compound being treated and any added material capable of reducing its unsaturation under the conditions of reaction. In other words, any material which, under the conditions of treatment, will react with the "Rosinyl" compound to reduce its unsaturation must be excluded. No added hydrogen is present during the treatment. However, inert substances and substances capable of reaction with the compound which do not reduce its unsaturation, may be present. Thus, inert solvents, inert gases, etc., may be present. While the treatment may be carried out in the presence of air, it is preferable to treat the "Rosinyl" compound or the partially hydrogenated "Rosinyl" compound in an atmosphere of a more inert gas, as, for example, carbon dioxide, nitrogen, etc.

The treatment in accordance with this invention may be carried out simultaneously with other reactions, which do not involve a change in the unsaturated characteristic of the rosin nucleus. Thus, rosin or a rosin acid may be treated with a hydrogenation catalyst to produce an intra- and inter-molecular rearrangement of the nucleus and, for example, simultaneously esterified with an alcohol, to produce a rosin ester of reduced unsaturation.

Contact between the "Rosinyl" compound or the partially hydrogenated "Rosinyl" compound and the catalyst should be maintained for from a few seconds to 5 hours or more, depending upon the temperature and upon the amount and activity of the catalyst employed. Upon the completion of the treatment, the resultant product may be easily separated from the catalyst by filtration. The product secured after the removal of the catalyst, if volatile, may if desired, be distilled under reduced pressure and separated into two or more fractions. Where a high melting point product is desired, such may be secured by the removal of the low-boiling fraction from the catalytically-treated material.

The product, in accordance with this invention, may be produced by one or more of the three alternate embodiments of the method in accordance with this invention. By the first of these alternate embodiments the corresponding "Rosinyl" compound may be treated, either alone or in solution, with a suitable catalyst to produce the "Hyex" reaction, as described hereinbefore. This embodiment will be most advantageous for the treatment of rosin compounds which are free from impurities which will poison the catalyst, or which are not of such nature that they act as catalyst poisons. Thus, rosin may be contacted with a catalyst to produce a "Hyex" rosin, or a rosin ester may be passed over a catalyst to produce a "Hyex" rosin ester.

By a second embodiment of the method in accordance with this invention a "Rosinyl" compound may be treated with a suitable catalyst to produce the "Hyex" reaction, and simultaneously reacted, either alone or in the presence of a solvent, with some other material which is incapable of affecting the unsaturation of the rosin acid or partially hydrogenated rosin acid nucleus or of poisoning the hydrogenation catalyst. Thus, a mixture of wood rosin and methanol may be treated with a suitable catalyst at an elevated temperature and pressure to produce a "Hyex" methyl abietate, which is identical in properties with the product secured by subjecting methyl abietate to the "Hyex" reaction.

By a third embodiment of the method in accordance with this invention a "Rosinyl" compound may be treated, either alone or in solution, with a suitable catalyst to produce the "Hyex" reaction and the product so formed reacted with another material to produce the desired product. Thus, for example, any of the different rosins may be contacted with a suitable catalyst, as hereinbefore described to produce a "Hyex" rosin, and then esterified by reaction with an alcohol to produce the "Hyex" rosin ester and the "Hyex" rosin ester so produced will be identical in properties with the "Hyex" rosin ester produced according to the first or second embodiments of my invention.

A wide variety of "Hyex" compounds may be prepared by this embodiment of my invention. Thus, any one of the rosins, rosin acids or partially hydrogenated rosins mentioned above may be subjected to the "Hyex" reaction, and then decarboxylated as, for example, by heating in contact with fuller's earth or a sulphonic acid catalyst to produce a "Hyex" rosin oil. A rosin or rosin ester may be subjected to "Hyex" treatment and then reduced to the corresponding alcohol, as for example, by hydrogenation of the acid, or reduction of the ester with sodium and alcohol. The alcohol so produced may then be etherified with another alcohol, such as, for example, one of the aliphatic, aromatic, or hydroaromatic alcohols mentioned hereinbefore. Alternately, a rosin acid may be reduced to the corresponding alcohol, as for example, by catalytic treatment with hydrogen and the product subjected to the "Hyex" reaction and then etherified.

This third embodiment of my invention is particularly useful for the production of "Hyex" compounds which cannot be easily produced by the first or second alternative methods, due to the corresponding "Rosinyl" compound or partially hydrogenated "Rosinyl" compound being of a nature such that it acts as a poison to the catalyst in the "Hyex" reaction. Thus, for example, many of the metallic salts of rosin acids or partially hydrogenated rosin acids have a tendency to poison the catalyst or to contain catalyst poisons unless proper precautionary measures are taken and, hence, cause difficulty in the "Hyex" reaction. "Hyex" rosin salts, however, may be readily prepared by subjecting a rosin acid or a partially hydrogenated rosin acid to the "Hyex" reaction and then forming the salt of the "Hyex" rosin acid produced. Thus, any one of the rosins, rosin acids, or partially hydrogenated rosins mentioned above may be subjected to the "Hyex" reaction and then reacted with a metallic hydroxide or other metallic compound, capable of forming a metallic salt with the "Hyex" rosin acid. Thus, the "Hyex" rosin acid may be reacted with an alkali metal hydroxide, for example, sodium or potassium hydroxide, to produce the corresponding alkali metal salt of the "Hyex" rosin with a heavy metal oxide or hydroxide, as for example, lead, cobalt, or manganese hydroxide, to produce the corresponding heavy metal salts.

The product in accordance with this invention, is a compound which contains somewhere in its structure a hydrocarbon group derived from an isomeric rosin acid, which has undergone what appears to be an intra- and inter-molecular rearrangement to eliminate its unsaturation as measured by the Wijis iodine value or the thiocyanate value. Such compounds may, for example, be of one of the following types: carboxylic acid, ester, alcohol, ether, hydrocarbon, metallic salt, etc. These compounds will be found to resemble, in general physical appearance, the compounds which have not been treated by the method in accordance with this invention, although frequently they are lighter in color and have a higher melting point than the corresponding untreated product. Chemically the treated and untreated compounds are identical with respect to the functional group, but different in regard to their chemical unsaturation.

Due to the substantially saturated character of the products prepared in accordance with this invention, their use will be found to be highly advantageous in many products in which untreated "Rosinyl" compounds are now used. Thus "Hyex" rosin, "Hyex" rosin acids, "Hyex" rosin ethers, etc. will be found advantageous for use in paints, varnishes and lacquers, in place of the corresponding "Rosinyl" compounds which have been used before. The "Hyex" rosin oils, because of their stability to oxidation, will be found useful as thread lubricants in spinning operations, as high boiling solvents for gums and resins, and as ingredients in greases. The alkali metal salts of the "Hyex" rosins are useful as paper size and soaps, and are advantageous in this use due to their resistance to chemical oxidation and as intermediates for additional syntheses. The heavy metal salts of "Hyex" rosin, such as, for example, those containing manganese, cobalt, zinc, lead, etc., are particularly useful as driers in paints and varnishes, since solutions containing such driers remain bright and of constant drying strength on aging.

The carboxylic acids included within the scope of this invention are the isomeric rosin acids, or commercial mixtures thereof in the various types of rosins, mentioned hereinbefore, which have been subjected to the "Hyex" treatment. The esters, in accordance with this invention, are compounds having the following formula:

R—COO—A in which R is a hydrocarbon nucleus of one of the isomeric rosin acids, which has been subjected to the "Hyex" treatment either before, during, or after the esterification reaction and A is a group derived from an alcohol. The ethers, in accordance with this invention, are compounds having the following formula:

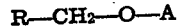

R—CH$_2$—O—A in which the R and A have the same meaning as in the formula given for the esters. The hydrocarbons, in accordance with this invention, are the hydrocarbon nuclei of the isomeric rosin acids which have been subjected to the "Hyex" treatment and from which the carboxyl group has been removed. Such "Hyex" "Rosinyl" hydrocarbons may be produced by subjecting rosin or a rosin acid to the "Hyex" treatment and then treating the resulting "Hyex" rosin or "Hyex" rosin acid to remove the carboxyl group. Alternately the rosin or rosin acid may be decarboxylated, by treatment with a sulfonic acid catalyst or any other reagent known to produce the decarboxylation of rosin, and the resulting hydrocarbon then subjected to the "Hyex" treatment. The salts, in accordance with this invention, are metallic salts of a "Hyex" rosin or "Hyex" rosin acid. Such salts will desirably be produced by subjecting the rosin or rosin acid to the "Hyex" treatment and then forming the salt by reaction with a suitable metallic compound, such as, for example, the metallic hydroxide. Alternately, but less desirable, the rosin or rosin acid may be treated with a suitable metallic compound to form the salt, and this salt then subjected to the "Hyex" treatment.

The following examples further illustrate the process and products in accordance with my invention.

EXAMPLE I

PREPARATION OF "HYEX" METHYL ABIETATE

Methyl abietate was contacted with the palladium supported on granular alumina described hertofore, at a temperature of 230° C. and for a period of 60 minutes. Table I gives a comparison of the properties of methyl abietate after this treatment, with those of the original methyl abietate.

Table I

|  | Methyl abietate (before treatment) | "Hyex" methyl abietate |
|---|---|---|
| Thiocyanate number | 94 | 4.1. |
| Physical condition at room temperature. | Liquid | Pasty crystals. |
| Color | Greenish-yellow | Colorless. |
| Methoxyl (CH$_3$O–) content | 9.7% | 9.6%. |

The comparisons shown in the above table demonstrate that the "Hyex" treatment has practically eliminated the unsaturation of the methyl abietate as measured by the thiocyanate value, increased its melting point, reduced its color, and had practically no effect on the extent of its esterification.

The following example in which "I" wood rosin is subjected simultaneously to the "Hyex" reaction and to esterification illustrates the second of the three alternate embodiments of this invention.

EXAMPLE II

PREPARATION OF "HYEX" METHYL ABIETATE

A mixture of 25 g. of "I" wood rosin, 10 g. of the palladium catalyst supported on granular alumina described hereinbefore, and 50 cc. of methanol were placed in an autoclave and heated at a temperature of 230–240° C. at a pressure of 100 pounds per sq. in. for a period of 1 hour. The reaction mixture was then filtered to remove the catalyst, and the excess methanol was removed by evaporation. The following table shows a comparison of the analyses of the product so obtained and that of the original "I" wood rosin, Table II

|  | "I" wood rosin (untreated) | "Hyex" methyl abietate |
|---|---|---|
| Thiocyanate value | 93 | 56. |
| Acid number | 169 | 55. |
| Methoxy content | 0.2% | 6.3%. |

These data demonstrate that the unsaturation of the rosin nucleus has been decreased approximately 40%, and that the acid number has been decreased approximately 67½% by esterification with the methyl alcohol, while the methoxy content indicates an esterification of approximately 65% on the basis of comparison with a theoretical methoxy value of 9.7% for a completely esterified methyl abietate.

EXAMPLE III

PREPARATION OF THE STEARYL ESTER OF "HYEX" AMERICAN GUM ROSIN

Thirty g. of "Hyex" American gum rosin produced by subjecting American gum rosin to the "Hyex" reaction was admixed with 24 g. of stearyl alcohol. This mixture was then heated at a temperature of 200° C. in a current of carbon dioxide for a period of 20 hours. At the end of this time it was found that the acid number of the rosin had been decreased from approximately 93 to 59. The reaction mixture was then cooled, dissolved in ether, and washed free of rosin acid with a sodium hydroxide solution and the solvent evaporated. The crude material so obtained was a mixture of stearyl alcohol and the stearyl ester of "Hyex" American gum rosin, and gave the following analyses:

| | Percent |
|---|---|
| Acid number | 1.5 |
| Hydroxyl content | 1.9 |
| Ester content | 70 |

This crude mixture was then freed from stearyl alcohol by heating at 200° C., and an absolute pressure of 2 m. until no further material could be distilled. The refined stearyl ester of "Hyex" American gum rosin so prepared is a soft wax at room temperature.

EXAMPLE IV

PREPARATION OF GLYCEROL ESTER OF "HYEX" AMERICAN GUM ROSIN

A mixture of 12.5 parts of glycerol and 100 parts of "Hyex" American gum rosin produced by subjecting American gum rosin to the "Hyex" reaction was heated at 270° C. for a period of 6½ hours in an atmosphere of carbon dioxide. At the end of this period the excess glycerine was removed from the reaction mixture by reducing the pressure to 15 m. for ½ hour at a temperature of 270° C. The remaining ester was then cooled to 200° C. while still under vacuum, and then cooled further to room temperature under atmospheric pressure. The product gave the following analyses:

| | |
|---|---|
| Acid number | 5 |
| Melting point (drop method) | 96° C. |
| Color | 80 ampere 41 red. |
| Grade (U. S. standard rosin types) | E. |

EXAMPLE V

PREPARATION OF GLYCEROL ESTER OF "HYEX" FRENCH GUM ROSIN

A mixture of 55 g. of the "Hyex" French gum rosin produced by subjecting French gum rosin to the "Hyex" reaction and 7 g. of glycerin was heated to 270° C. for 7 hours in an atmosphere of carbon dioxide. During the last 30 minutes of heating, the carbon dioxide was bubbled through the reaction mixture to remove the excess glycerine. The product obtained was a hard resin having an acid number of 5.

EXAMPLE VI

PREPARATION OF "HYEX" WOOD ROSIN OIL

Four hundred g. of the "Hyex" wood rosin produced by subjecting wood rosin to the "Hyex" reaction was heated to 285° C. with 1/10 of 1% by weight of paratoluene sulfonic acid. The temperature was then raised to 220° C., and maintained at this point for 4 hours. This treatment produced 390 g. of a crude rosin oil having an acid number of 58 as compared with an acid number of 160 for the original "Hyex" wood rosin. Substantially neutral oil was then produced by dissolving 150 g. of this crude oil in 200 g. of petroleum ether, washing this solution with an aqueous caustic soda solution, and evaporating the petroleum ether. Ninety-seven g. of an oil having the following analyses was obtained:

| | |
|---|---|
| Acid number | 1.0 |
| Refractive index at 20° C | 1.5475 |
| Thiocyanate value | 40.5 |

A second portion of the crude rosin oil was purified by an alternative procedure as follows:

Fifteen g. of sodium carbonate and 25 g. of water was added to 150 g. of the crude oil. When the reaction was complete the mixture was heated and the water evaporated. This product was then distilled under reduced pressure to give 80 g. of a pale rosin oil as a distillate. This pale rosin oil gave the following analyses:

| | |
|---|---|
| Acid number | 0.75 |
| Refractive index at 20° C | 1.5543 |
| Thiocyanate value | 31.5 |

The fact that the changes in a "Rosinyl" compound caused by the "Hyex" treatment, in accordance with this invention, occur solely within the hydrocarbon nucleus derived from a rosin acid in the "Rosinyl" compound treated, and that identical compounds can be produced by following the different embodiments of the method in accordance with this invention, is strikingly demonstrated by the following experiment:

Abietic acid was given the "Hyex" treatment in accordance with this invention to produce a "Hyex" abietic acid. This product was then esterified with methyl alcohol and the ester nitrated. The resultant crystalline nitrate melted at 185° C. Pure methyl abietate, made from untreated abietic acid was then given the "Hyex" treatment by the method in accordance with this invention as shown in Example I, above, and subsequently nitrated. This crystalline nitrate also melted at 185° C., and a mixture of this nitrate and the nitrate produced as described above melted sharply at 185° C. The two nitrates are thus proved to be chemically identical, which proves that the "Hyex" treatment in accordance with this invention, affects only the hydrocarbon nucleus of the "Rosinyl" compound.

It will be understood that the details and examples hereinbefore set forth are illustrative only, and that the invention as herein broadly described and claimed is in no way limited thereby.

It will be understood that the term "unsaturation" is used in this specification and in the appended claims to refer to the unsatisfied carbon valences of the type represented by a double bond in unsaturated aliphatic compounds and conveniently measured by the thiocyanate value.

This application is a division of my application for United States Letters Patent, Serial No. 84,877, filed June 12, 1936, which is in turn a continuation-in-part of my application for United States Letters Patent, Serial No. 6,403, filed February 13, 1935.

What I claim and desire to protect by Letters Patent is:

1. A compound of the formula

in which R is the hydrocarbon nucleus of an acid of the group consisting of rosins, rosin acids, partially hydrogenated rosins, and partially hydrogenated rosin acids, which has been treated with a hydrogenation catalyst in the absence of any added substance capable of reducing the unsaturation of the hydrocarbon nucleus under the conditions of treatment, and A is a hydrocarbon radical of an aliphatic, aromatic or hydroaromatic alcohol, the said compound being characterized by the fact that it has a lesser degree of unsaturation than that of a similar compound in which R is untreated.

2. A compound of the formula

in which R is the hydrocarbon nucleus of a rosin acid which has been treated with a hydrogenation catalyst in the absence of any added substance capable of reducing the unsaturation of the hydrocarbon nucleus under the conditions of treatment, and A is a hydrocarbon radical of an aliphatic, aromatic or hydroaromatic alcohol, the said compound being characterized by the fact that it has a lesser degree of unsaturation than that of a similar compound in which R is untreated.

3. A compound of the formula

in which R is the hydrocarbon nucleus of a rosin acid which has been treated with a hydrogenation catalyst in the absence of any added substance capable of reducing the unsaturation of the hydrocarbon nucleus under the conditions of treatment, and A is a hydrocarbon radical of an aliphatic alcohol, the said compound being characterized by the fact that it has a lesser degree of unsaturation than that of a similar compound in which R is untreated.

4. A product formed by treating a monohydric alcohol ester of a rosin with a hydrogenation catalyst in the absence of added substances capable of reducing the unsaturation of the material under the conditions of treatment, said product being characterized by the fact that it has a lesser degree of unsaturation than the material from which it was formed.

5. A product formed by treating a polyhydric alcohol ester of a rosin with a hydrogenation catalyst in the absence of added substances capable of reducing the unsaturation of the material under the conditions of treatment, said product being characterized by the fact that it has a lesser degree of unsaturation than the material from which it was formed.

6. A product formed by treating a monohydric alcohol ester of wood rosin with a hydrogenation catalyst in the absence of added substances capable of reducing the unsaturation of the material under the conditions of treatment, said product being characterized by the fact that it has a lesser degree of unsaturation than the material from which it was formed.

7. A product formed by treating a polyhydric alcohol ester of wood rosin with a hydrogenation catalyst in the absence of added substances capable of reducing the unsaturation of the material under the conditions of treatment, said product being characterized by the fact that it has a lesser degree of unsaturation than the material from which it was formed.

8. A product formed by treating glycerol abietate with a hydrogenation catalyst in the absence of added substances capable of reducing the unsaturation of the material under the conditions of treatment, said product being characterized by the fact that it has a lesser degree of unsaturation than the material from which it was formed.

9. A product formed by treating methyl abietate with a hydrogenation catalyst in the absence of added substances capable of reducing the unsaturation of the material under the conditions of treatment, said product being characterized by the fact that it has a lesser degree of unsaturation than the material from which it was formed.

10. The method of treating a rosin ester which includes contacting a rosin ester with a hydrogenation catalyst in the absence of added substances capable of reducing the unsaturation of the rosin ester whereby the unsaturation of the rosin ester is reduced.

11. The method of treating a rosin ester which includes heating a rosin ester with a hydrogenation catalyst in the absence of added substances capable of reducing the unsaturation of the rosin ester whereby the unsaturation of the rosin ester is reduced.

12. The method of treating a rosin ester which includes heating a rosin ester with a hydrogenation catalyst at a temperature within the range of about 150° C. to about 250° C. in the absence of added substances capable of reducing the unsaturation of the rosin ester whereby the unsaturation of the rosin ester is reduced.

13. The method of treating a rosin ester which includes contacting a rosin ester with a noble metal hydrogenation catalyst in the absence of added substances capable of reducing the unsaturation of the rosin ester.

14. The method of treating a rosin ester which includes contacting a rosin ester with a base metal hydrogenation catalyst in the absence of added substances capable of reducing the unsaturation of the rosin ester whereby the unsaturation of the rosin ester is reduced.

15. The method of treating a rosin ester which includes contacting a rosin ester with a palladium hydrogenation catalyst in the absence of added substances capable of reducing the unsaturation of the rosin ester.

16. The method of treating a rosin ester which includes contacting a rosin ester with a catalyst comprising palladium black supported on granular alumina in the absence of added substances capable of reducing the unsaturation of the rosin ester.

17. The method of treating a rosin ester which includes contacting a rosin ester at an elevated temperature and in liquid phase with a hydrogenation catalyst in the absence of added substances capable of reducing the unsaturation of the rosin ester whereby the unsaturation of the rosin ester is reduced.

18. The method of treating a rosin ester which includes contacting a rosin ester with a noble metal hydrogenation catalyst at a temperature within the range of about 150° C. to about 250° C. in the absence of added substances capable of reducing the unsaturation of the rosin ester.

19. The method of treating a rosin ester which includes contacting a rosin ester at an elevated temperature and in liquid phase with a nickel hydrogenation catalyst in the absence of added substances capable of reducing the unsaturation of the rosin ester.

20. The method of treating a rosin ester which includes contacting a rosin ester in liquid phase and at an elevated temperature with a catalyst comprising palladium black supported on granular alumina, in the absence of added substances capable of reducing the unsaturation of the rosin ester.

EDWIN R. LITTMANN.